United States Patent
Arikawa

(10) Patent No.: US 11,728,900 B2
(45) Date of Patent: Aug. 15, 2023

(54) COMMUNICATION SYSTEM, RECEIVER, EQUALIZATION SIGNAL PROCESSING CIRCUIT, METHOD, AND NON-TRANSITORY COMPUTER READABLE MEDIUM

(71) Applicant: NEC Corporation, Tokyo (JP)

(72) Inventor: Manabu Arikawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/726,870

(22) Filed: Apr. 22, 2022

(65) Prior Publication Data

US 2022/0385374 A1 Dec. 1, 2022

(30) Foreign Application Priority Data

May 11, 2021 (JP) .................................. 2021-080278

(51) Int. Cl.
    *H04B 10/61*  (2013.01)
    *H04B 10/58*  (2013.01)
    *H04L 25/03*  (2006.01)

(52) U.S. Cl.
    CPC ......... *H04B 10/6163* (2013.01); *H04B 10/58* (2013.01); *H04L 25/03057* (2013.01); *H04L 25/03165* (2013.01)

(58) Field of Classification Search
    None
    See application file for complete search history.

(56) References Cited

U.S. PATENT DOCUMENTS

| | | | | |
|---|---|---|---|---|
| 8,447,186 | B2* | 5/2013 | Tanimura | H04B 10/25133 398/147 |
| 8,861,981 | B2* | 10/2014 | Liu | H04B 10/25133 398/208 |
| 9,853,765 | B2* | 12/2017 | Yasuda | H04B 10/6163 |
| 2011/0255879 | A1* | 10/2011 | Xie | H04B 10/2543 398/208 |
| 2019/0207589 | A1* | 7/2019 | Alic | H04L 25/03012 |

FOREIGN PATENT DOCUMENTS

WO 2022/091452 A1 5/2022

OTHER PUBLICATIONS

"Digital filters for coherent optical receivers", S. J. Savory, Optics Express 804, vol. 16, No. 2, Jan. 21, 2008.

(Continued)

*Primary Examiner* — Jai M Lee
(74) *Attorney, Agent, or Firm* — Sughrue Mion, PLLC

(57) ABSTRACT

A detector coherent-receives a signal being transmitted from a transmitter. A filter group includes a plurality of filters connected in series along a signal path of a reception signal. The plurality of filters include a plurality of non-linear distortion compensation filters and one or more linear distortion compensation filters. A coefficient updating unit controls a filter coefficient of the plurality of non-linear distortion compensation filters and a filter coefficient of at least some of the linear distortion compensation filters. The coefficient updating unit adaptively controls the filter coefficient, by using an error back propagation method, based on a difference between an output signal being output from the filter group and a predetermined value of the output signal.

17 Claims, 13 Drawing Sheets

(56) References Cited

OTHER PUBLICATIONS

"Adaptive equalization of transmitter and receiver IQ skew by multi-layer linear and widely linear filters with deep unfolding", M. Arikawa and K. Hayashi, Optics Express 23478, vol. 28, No. 16, Aug. 3, 2020.
"Equalizing nonlinearities with memory effects: Volterra series vs. deep neural networks", C. Bluemm et al., ECOC 2019, W.3.8.3.

* cited by examiner

COMMUNICATION SYSTEM, RECEIVER, EQUALIZATION SIGNAL PROCESSING CIRCUIT, METHOD, AND NON-TRANSITORY COMPUTER READABLE MEDIUM

INCORPORATION BY REFERENCE

This application is based upon and claims the benefit of priority from Japanese patent application No. 2021-080278, filed on May 11, 2021, the disclosure of which is incorporated herein in its entirety by reference.

TECHNICAL FIELD

The present disclosure relates to a communication system, a receiver, an equalization signal processing circuit, an equalization signal processing method, and a non-transitory computer readable medium.

BACKGROUND ART

In order to achieve high spectral utilization efficiency in optical fiber communication, multi-level modulation such as high-order quadrature amplitude modulation (QAM) is adopted. Since introduction of coherent reception technology, it has become possible to perform flexible equalization signal processing on a reception side by digital signal processing, such as by collectively compensating for wavelength dispersion accumulated in an optical fiber transmission path at the reception side. Generally, however, a high-order multi-level modulation signal is susceptible to distortion. For this reason, distortion caused by imperfection of a component in a transceiver or the like is becoming a new bottleneck in promoting high multi-level.

As a related art, "Digital filters for coherent optical receivers" (S. J. Savory, Opt. Express 16(2), 804 (2008)) (also referred to as Non Patent Literature 1) discloses reception side equalization digital signal processing that performs equalization of a coherent-received QAM signal. FIG. 8 illustrates an example of the reception side equalization digital signal processing described in Non Patent Literature 1. The equalization digital signal processing includes a wavelength dispersion compensation 501, a polarization separation 502, and a carrier phase compensation 503. It is assumed that reception signals of each of X/Y polarization being coherent-received by a receiver are $x_1$ and $x_2$. Assuming that an in-phase component (I) and a quadrature component (Q) of each of polarization are $x_{jI}$ and $x_{jQ}$, the reception signal is represented by $x_j = x_{jI} + ix_{jQ}$.

The wavelength dispersion compensation 501 compensates for wavelength dispersion occurring when an optical signal propagates through an optical fiber. The wavelength dispersion compensation 501 includes a static filter being independent of each polarization. A coefficient of the static filter included in the wavelength dispersion compensation 501 is determined in such a way as to have an inverse characteristic of wavelength dispersion determined from an accumulated wavelength dispersion amount.

The polarization separation 502 compensates for a polarization state variation and polarization mode dispersion that occur in an optical signal during propagation in an optical fiber. The polarization separation 502 includes a multi-input multi-output (MIMO) filter having a cross term between polarized waves. FIG. 9 illustrates a 2×2 MIMO filter used for the polarization separation 502. A MIMO filter 600 includes, for example, 2×2 finite impulse response (FIR) filters 601. A coefficient of each of the FIR filters 601 is represented by $h_{11}$, $h_{12}$, $h_{21}$, and $h_{22}$.

The polarization state variation occurring in an optical signal during propagation in an optical fiber changes with time depending on an external environment. A coefficient updating unit 510 adaptively controls the coefficient of each FIR filter 601 in such a way as to follow the polarization state variation, based on an input and an output of the 2×2 MIMO filter (polarization separation 502). In the polarization separation 502, an algorithm such as a constant modulus algorithm (CMA), a data-aided least mean square (DALMS) algorithm, or a decision-directed least mean square (LMS) algorithm is used for coefficient update. These algorithms are algorithms of updating the coefficient in such a way as to minimize average magnitude of a difference between a filter output and a desired state. In these algorithms, a coefficient update amount is calculated by using an input and an output of a filter.

The carrier phase compensation 503 compensates for a frequency offset and a phase offset between a carrier frequency of a transmitted optical signal and local oscillator light on the reception side. The carrier phase compensation 503 includes a filter that performs phase rotation on the reception signal independently for each polarization. A phase-locked loop (PLL) 520 determines a phase rotation amount of the carrier phase compensation 503. After the carrier phase compensation, signals $y_1$ and $y_2$ of each polarization in which various pieces of distortion are compensated are acquired.

The reception side equalization digital signal processing illustrated in FIG. 8 is difficult to compensate for IQ distortion occurring in a transmitter or receiver, such as a mismatch in average signal strength between IQ components, a time offset between IQ components, and a quadrature offset between IQ components. This is because a complex signal input complex coefficient filter such as the MIMO filter illustrated in FIG. 9 is difficult to provide an independent response for each IQ component. In this sense, the complex signal input complex coefficient filter is referred to as strictly linear (SL).

In order to compensate for the IQ distortion occurring in the transmitter or receiver, a filter capable of handling the IQ components independently is required. Such a filter is, for example, a MIMO filter with a real coefficient, in which a signal of a real number of each IQ component is input and output. The MIMO filter with the real coefficient is equivalent to a filter in which a complex signal and a complex conjugate thereof are as an input and a complex signal is as an output. These filters are referred to as widely linear (WL).

IQ distortion is generally not order interchangeable with other distortion such as wavelength dispersion. Therefore, as in the configuration in FIG. 8, when an IQ distortion compensation block is provided by distortion compensation for each block, the order is important.

An example of reception side equalization digital signal processing for equalizing various pieces of distortion in optical fiber communication, including IQ distortion occurring in a transmitter or receiver, is described in "Adaptive equalization of transmitter and receiver IQ skew by multi-layer linear and widely linear filters with deep unfolding" (M. Arikawa and K. Hayashi, Opt. Express 28(16), 23478 (2020)) (also referred to as Non Patent Literature 2). FIG. 10 illustrates an adaptive multi-layer filter that performs equalization signal processing. The adaptive multi-layer filter includes, in this order, an intra-receiver distortion compensation 701, a wavelength dispersion compensation 702, a polarization separation 703, a carrier phase compensation 704, and an intra-transmitter distortion compensation 705.

The intra-receiver distortion compensation 701 includes a WL 2×1 filter for each polarization, i.e., for each of input signals $x_1$ and $x_2$. The wavelength dispersion compensation 702 includes an SL filter for each polarization. The polarization separation 703 includes a 2×2 MIMO SL filter. The carrier phase compensation 704 includes an SL filter for each polarization. The intra-transmitter distortion compensation 705 includes a WL 2×1 filter for each polarization.

FIG. 11 illustrates a WL 2×1 filter to be used for the intra-receiver distortion compensation 701 and the intra-transmitter distortion compensation 705. A WL 2×1 filter 800 includes a complex conjugate calculation unit 801. The complex conjugate calculation unit 801 calculates a complex conjugate of an input complex signal. In the WL 2×1 filter 800, a complex signal is input to a FIR filter 802, and a complex conjugate signal is input to a FIR filter 803. The WL 2×1 filter 800 outputs a signal acquired by adding an output of the FIR filter 802 and an output of the FIR filter 803. The intra-receiver distortion compensation 701 and the intra-transmitter distortion compensation 705 each have such a WL 2×1 filter 800 for each polarization.

Characteristics of intra-transmitter distortion and intra-receiver distortion occurring in an optical communication system are usually unknown. Therefore, filter coefficients of the intra-receiver distortion compensation 701 and the intra-transmitter distortion compensation 705 need to be adaptively controlled. However, as in the configuration in FIG. 8, it is difficult in this case to control the coefficient, based on a direct input and output of each of filter blocks. This is because, in blocks other than the last intra-transmitter distortion compensation 705, distortion that is not compensated remains in the output. This makes it extremely difficult to design a suitable loss function to be minimized for adaptive control.

In FIG. 10, a loss function calculation unit 730 calculates, as a loss function, magnitude of a difference from a desired state of the filter output of a final layer, i.e., the output of the intra-transmitter distortion compensation 705. A coefficient updating unit 710 calculates a gradient for the loss function of all the coefficients of each filter block, based on a fact that the outputs of all the filter blocks can be represented differentially with respect to their inputs and coefficients, and based on an error back propagation method. The coefficient updating unit 710 adaptively controls the coefficient of each filter block in such a way as to minimize the loss function by using the calculated gradient.

A PLL 720 determines a phase rotation amount of the carrier phase compensation 704. The carrier phase compensation 704 is controlled by the PLL 720. By using the adaptive multi-layer filter illustrated in FIG. 10, even when a plurality of pieces of distortion including IQ distortion in the transmitter and the receiver are present at the same time, high-accuracy reception side equalization digital signal processing can be achieved.

All pieces of distortion to be handled in the configuration in FIG. 10 are linear distortion, although there is a difference between SL and WL. In an actual optical fiber communication system, non-linear distortion also occurs in a reception signal. Typical non-linear distortion is non-linear distortion caused by an optical Kerr effect that occurs during propagation in an optical fiber. In addition, non-linear distortion occurs in the transmitter and the receiver due to imperfection of a device, for example, a characteristic of an optical modulator and a characteristic of a transimpedance amplifier. As a signal becomes more multi-leveled and complex, there is a need for a countermeasure against such non-linear distortion occurring in the transmitter and the receiver.

Regarding non-linear distortion compensation, "Equalizing nonlinearities with memory effects: Volterra series vs. deep neural networks" (C. Bluemm et al., ECOC 2019, W.3.B.3) (also referred to as Non Patent Literature 3) discloses reception side digital signal processing that performs equalization including non-linear distortion compensation in a transmitter and a receiver. FIG. 12 illustrates an example of the reception side digital signal processing described in Non Patent Literature 3. The reception side digital signal processing includes a wavelength dispersion compensation 901, a polarization separation 902, a carrier phase compensation 903, and a non-linear distortion compensation 904. The wavelength dispersion compensation 901, the polarization separation 902, and the carrier phase compensation 903 in FIG. 12 are similar to the wavelength dispersion compensation 501, the polarization separation 502, and the carrier phase compensation 503 in FIG. 8. A coefficient updating unit 910 adaptively controls a coefficient of a filter, based on an input and an output of the polarization separation 902. The carrier phase compensation 903 is controlled by a PLL 920.

In FIG. 12, the non-linear distortion compensation 904, which is a filter block for distortion compensation in the transmitter and the receiver, is arranged in a subsequent stage of the wavelength dispersion compensation 901, the polarization separation 902, and the carrier phase compensation 903. The non-linear distortion compensation 904 includes a non-linear filter. Non Patent Literature 3 describes an example of a case where the non-linear filter is constituted of a deep neural network (DNN) and a Volterra filter. A coefficient updating unit 930 controls internal parameters, i.e., coefficients, of the DNN and the Volterra filter. The coefficient updating unit 930 controls the coefficient of the non-linear filter in such a way as to minimize average magnitude of a difference from a desired state of the direct output of the non-linear distortion compensation 904.

However, in the configuration in FIG. 12, since non-linear distortion is not compensated in stages of the polarization separation 902 and the carrier phase compensation 903 in a preceding stage of the non-linear distortion compensation 904, the coefficient updates are affected by remaining non-linear distortion. In addition, non-linear distortion may occur in both the transmitter and the receiver, but the pieces of distortion are not order interchangeable with other distortion, such as wavelength dispersion. Therefore, it is affected that the distortion compensation may be imperfect. As described above, in an optical fiber communication system in which various pieces of distortion including non-linear distortion in a transmitter and a receiver are present, there has been a problem that compensation performance is limited when the non-linear distortion compensation in a transmitter and a receiver is performed.

SUMMARY

An example object of the present disclosure is to provide a communication system, a receiver, an equalization signal processing circuit, a method, and a non-transitory computer readable medium that are capable of performing non-linear distortion compensation in a transmitter and a receiver with high accuracy, in a communication system in which various pieces of distortion including non-linear distortion in the transmitter and the receiver are present.

An equalization signal processing circuit according to a first example aspect of the present disclosure includes:

a filter group configured to include a plurality of filters connected in series along a signal path of a reception signal being coherent-received, the plurality of filters including a plurality of non-linear distortion compensation filters configured to compensate for non-linear distortion included in the reception signal and one or more linear distortion compensation filters configured to compensate for linear distortion included in the reception signal;

at least one memory storing instructions; and at least one processor configured to execute the instructions to:

adaptively control, by using an error back propagation method, a filter coefficient of at least some of a plurality of non-linear distortion compensation filters and the linear distortion compensation filter, based on a difference between an output signal being output from the filter group and a predetermined value of the output signal.

An equalization signal processing method according to a second example aspect of the present disclosure includes:

calculating a loss function, based on a difference between an output signal being output from a filter group in which a plurality of filters connected in series along a signal path of a reception signal being coherent-received are included, the plurality of filters including a plurality of non-linear distortion compensation filters configured to compensate for non-linear distortion included in the reception signal and one or more linear distortion compensation filters configured to compensate for linear distortion included in the reception signal, and a predetermined value of the output signal; and adaptively controlling, by using an error back propagation method, a filter coefficient of at least some of a plurality of non-linear distortion compensation filters and the linear distortion compensation filter, based on the loss function.

A non-transitory computer readable medium according to a third example aspect of the present disclosure stores a program for causing a processor to execute processing of:

calculating a loss function, based on a difference between an output signal being output from a filter group in which a plurality of filters connected in series along a signal path of a reception signal being coherent-received are included, the plurality of filters including a plurality of non-linear distortion compensation filters configured to compensate for non-linear distortion included in the reception signal and one or more linear distortion compensation filters configured to compensate for linear distortion included in the reception signal, and a predetermined value of the output signal; and adaptively controlling, by using an error back propagation method, a filter coefficient of at least some of a plurality of non-linear distortion compensation filters and the linear distortion compensation filter, based on the loss function.

BRIEF DESCRIPTION OF DRAWINGS

The above and other aspects, features and advantages of the present disclosure will become more apparent from the following description of certain exemplary embodiments when taken in conjunction with the accompanying drawings, in which.

EMBODIMENTS

Figure 1:
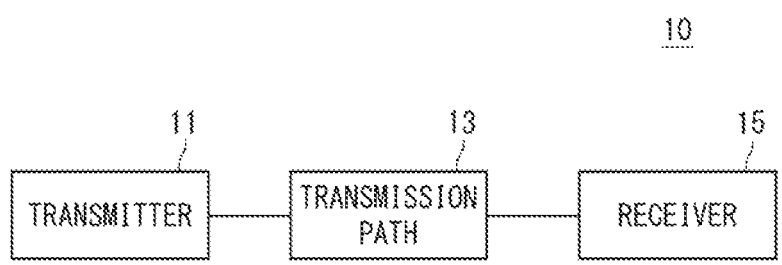
FIG. 1 is a block diagram schematically illustrating a communication system according to the present disclosure.

Prior to description of an example embodiment of the present disclosure, an outline of the present disclosure will be described. FIG. 1 schematically illustrates a communication system according to the present disclosure. A communication system 10 includes a transmitter 11 and a receiver 15. The transmitter 11 and the receiver 15 are connected to each other via a transmission path 13. The transmitter 11 transmits a signal via the transmission path 13. The receiver 15 receives a signal transmitted from the transmitter 11 via the transmission path 13.

Figure 2:
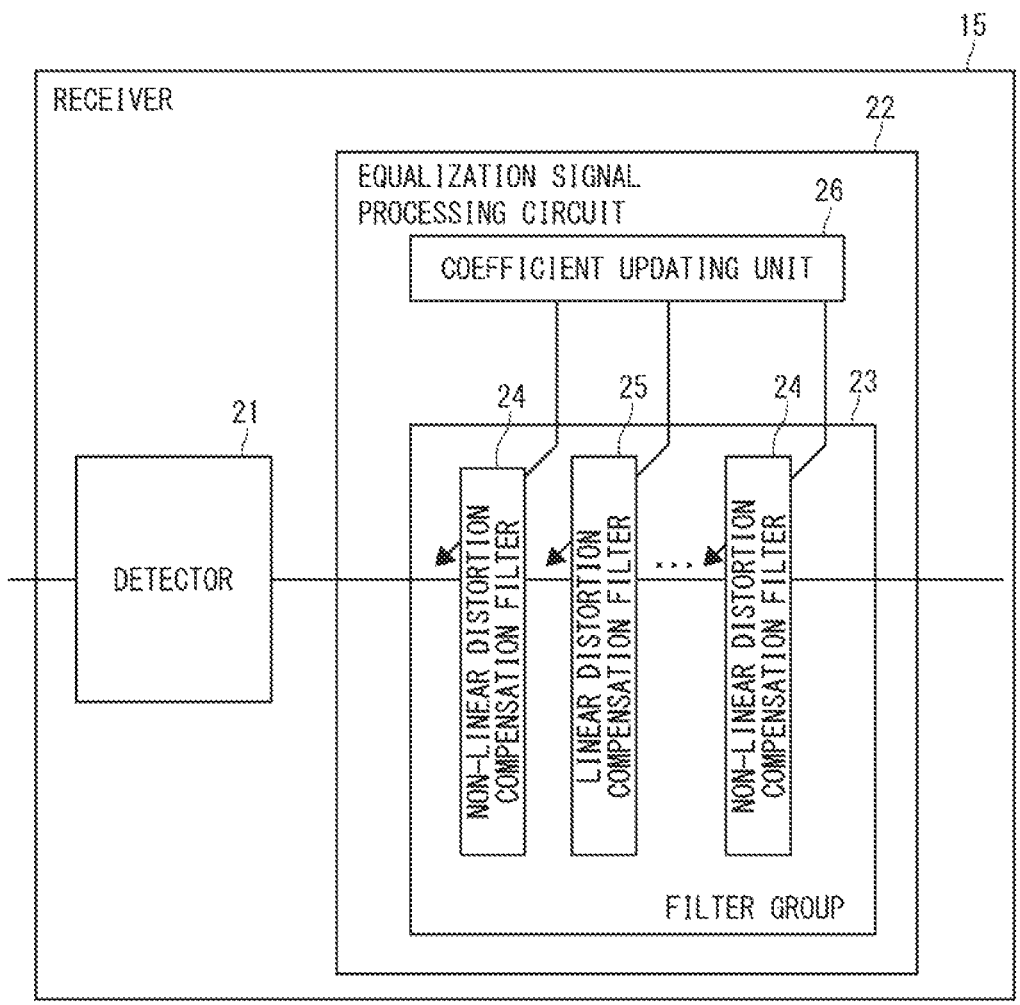
FIG. 2 is a block diagram illustrating a schematic configuration of a receiver.

FIG. 2 illustrates a schematic configuration of the receiver 15. The receiver 15 includes a detector 21 and an equalization signal processing circuit 22. The detector 21 coherent-receives a signal transmitted from the transmitter 11. The equalization signal processing circuit 22 performs equalization signal processing on the reception signal being coherent-received.

The equalization signal processing circuit 22 includes a filter group 23 and a coefficient updating unit 26. The filter group 23 includes a plurality of filters connected in series along a signal path of a reception signal. The plurality of filters includes a plurality of non-linear distortion compensation filters 24 and one or more linear distortion compensation filters 25. Each of the non-linear distortion compensation filters 24 compensates for non-linear distortion included in the reception signal. Each of the linear distortion compensation filters 25 compensates for linear distortion included in the reception signal.

The coefficient updating unit 26 controls filter coefficients of the plurality of non-linear distortion compensation filters 24 and at least one filter coefficient of one or more linear distortion compensation filters 25. The coefficient updating unit 26 adaptively controls the filter coefficient, by using the error back propagation method, based on a difference between an output signal being output from the filter group 23 and a predetermined value of the output signal.

In the present disclosure, the coefficient updating unit 26 calculates a gradient of each filter coefficient by the error back propagation method, for example, as a loss function to minimize magnitude of a difference from a desired state of an output of a final filter block of the filter group 23. The coefficient updating unit 26 controls the filter coefficient of the non-linear distortion compensation filter 24 and the filter coefficient of at least some of the linear distortion compensation filter 25 in response to the gradient of the filter coefficient. In the present disclosure, the coefficient updating unit 26 controls the filter coefficients of not only the final stage filter but also the non-linear distortion compensation filter 24 arranged in a preceding stage, by using the magnitude of the difference from the desired state of the output of the final filter block of the filter group 23. By adopting such a configuration, in a communication system in which various pieces of distortion are present in a reception signal, it is possible to perform non-linear distortion compensation in a transmitter and a receiver with high accuracy.

Figure 3:
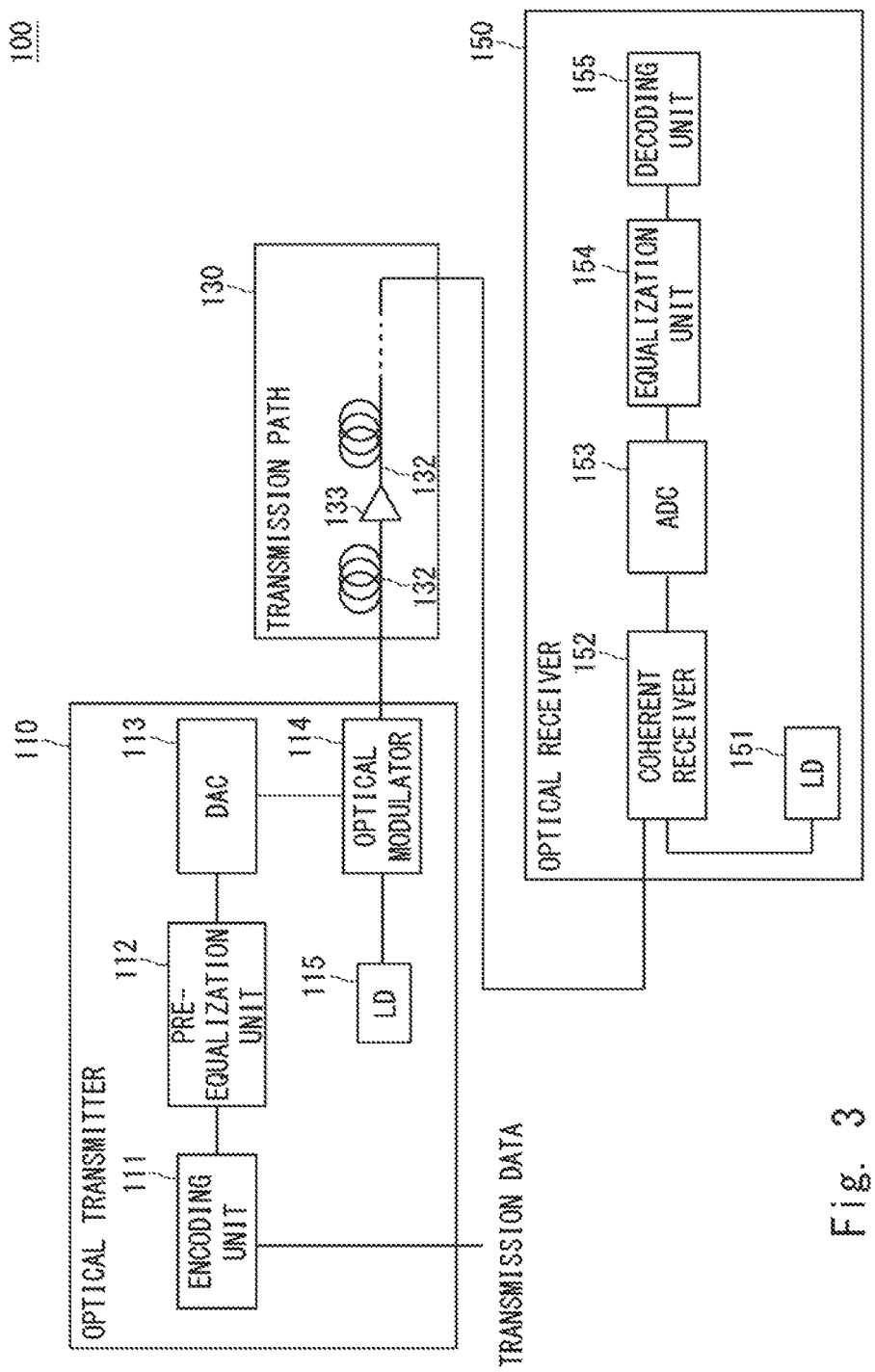
FIG. 3 is a block diagram illustrating a signal transmission system according to one example embodiment of the present disclosure.

Hereinafter, an example embodiment of the present disclosure will be described in detail with reference to the drawings. FIG. 3 illustrates a signal transmission system according to one example embodiment of the present disclosure. In the present example embodiment, it is assumed that the signal transmission system is an optical fiber communication system that adopts a polarization multiplexing QAM system and performs coherent reception. An optical fiber communication system 100 includes an optical transmitter 110, a transmission path 130, and an optical receiver 150. The optical fiber communication system 100 constitutes, for example, an optical submarine cable system. The optical fiber communication system 100 corresponds to the communication system 10 illustrated in FIG. 1. The optical transmitter 110 corresponds to the transmitter 11 illustrated in FIG. 1. The transmission path 130 corresponds to the transmission path 13 illustrated in FIG. 1. The optical receiver 150 corresponds to the receiver 15 illustrated in FIG. 1.

The optical transmitter 110 converts a transmission data into a polarization multiplexed optical signal. The optical transmitter 110 includes an encoding unit 111, a pre-equalization unit 112, a digital analog converter (DAC) 113, an optical modulator 114, and a laser diode (LD) 115. The encoding unit 111 encodes a transmission data and generates a signal sequence for optical modulation. In a case of the polarization multiplexing QAM system, the encoding unit 111 generates a total of four series of signals being an in-phase (I) component and a quadrature (Q) component of each of X polarization (first polarization) and Y polarization (second polarization). Note that, in FIG. 3, for the sake of simplification of the drawing, encoded four-series signals are illustrated as one solid line. Hereinafter, one solid line illustrated in FIG. 3 collectively represents signal series having a predetermined number, as a physical entity.

The pre-equalization unit 112 performs pre-equalization for compensating for distortion or the like of a device in the optical transmitter 110 in advance for the encoded four-series signal. The DAC 113 converts each of the four-series signals being performed the pre-equalization into an analog electric signal.

The LD 115 outputs continuous wave (CW) light. The optical modulator 114 modulates the CW light output from the LD 115 in response to the four-series signals output from the DAC 113, and generates an optical signal of polarization multiplexing QAM. The optical signal (polarization multiplexed optical signal) generated by the optical modulator 114 is output to the transmission path 130.

The transmission path 130 transmits the polarization multiplexed optical signal output from the optical transmitter 110 to the optical receiver 150. The transmission path 130 includes an optical fiber 132 and an optical amplifier 133. The optical fiber 132 guides an optical signal transmitted from the optical transmitter 110. The optical amplifier 133 amplifies an optical signal, and compensates for a propagation loss in the optical fiber 132. The optical amplifier 133 is configured, for example, as an erbium doped fiber amplifier (EDFA). The transmission path 130 may include a plurality of optical amplifiers 133.

The optical receiver 150 includes an LD 151, a coherent receiver 152, an analog digital converter (ADC) 153, an equalization unit 154, a decoding unit 155, and a distortion estimation unit 156. In the optical receiver 150, circuits such as the equalization unit (equalizer) 154 and the decoding unit (decoder) 155 may be configured by using a device such as a digital signal processor (DSP), for example.

The LD 151 outputs CW light as local oscillator light. In the present example embodiment, the coherent receiver 152 is configured as a polarization diversity type coherent receiver. The coherent receiver 152 performs coherent detection on an optical signal transmitted through the optical fiber 132, by using the CW light output from the LD 151. The coherent receiver 152 outputs four-series reception signals (electric signals) being equivalent to the I component and Q component of the X polarization and Y polarization being performed coherent detection. The coherent receiver 152 corresponds to the detector 21 illustrated in FIG. 2.

The ADC 153 samples the reception signal output from the coherent receiver 152, and converts the reception signal into a signal in a digital domain. The equalization unit 154 performs reception side equalization signal processing on the four-series reception signals being sampled by the ADC 153. The equalization unit 154 performs equalization signal processing on the reception signal, and thereby compensates for various pieces of distortion in the optical fiber communication system including non-linear distortion occurring in the optical transmitter 110 and the optical receiver 150. The decoding unit 155 decodes the signal being performed the equalization signal processing by the equalization unit 154, and restores the transmitted data. The decoding unit 155 outputs the restored data to not-illustrated another circuit.

Figure 4:
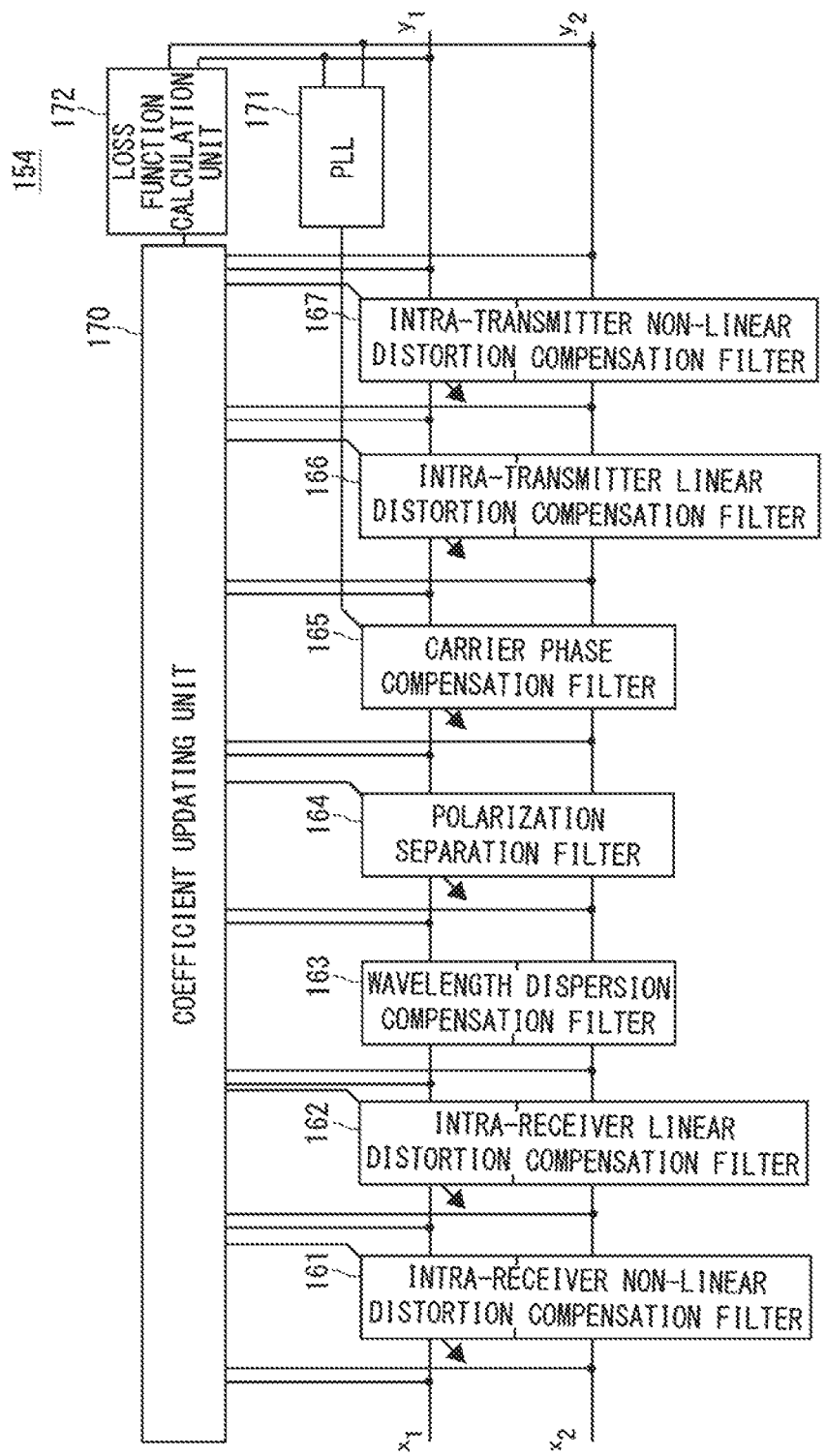
FIG. 4 is a block diagram illustrating an example of digital signal processing in an equalization unit.

FIG. 4 illustrates an example of digital signal processing in the equalization unit 154. The equalization unit 154 includes an intra-receiver non-linear distortion compensation filter 161, an intra-receiver linear distortion compensation filter 162, a wavelength dispersion compensation filter 163, a polarization separation filter 164, a carrier phase compensation filter 165, an intra-transmitter linear distortion compensation filter 166, and an intra-transmitter non-linear distortion compensation filter 167 in this order from an input side of an optical signal. The equalization unit 154 further includes a coefficient updating unit 170, a phase-locked loop (PLL) 171, and a loss function calculation unit 172. The equalization unit 154 corresponds to the equalization signal processing circuit 22 illustrated in FIG. 2.

Considering an optical fiber communication system, distortion occurs in the following order: (1) distortion in a transmitter, (2) a phenomenon in an optical fiber (wavelength dispersion, polarization variation/polarization mode dispersion), (3) a frequency offset, and (4) distortion in a receiver. Herein, (2) and (3) are interchangeable when a non-linear effect in an optical fiber is ignored. In the present example embodiment, in consideration of an order in which distortion occurs and interchangeability, a filter which performs intra-receiver non-linear distortion compensation, intra-receiver linear distortion compensation, wavelength dispersion compensation, polarization variation compensation, carrier phase compensation, intra-transmitter linear distortion compensation, and intra-transmitter non-linear distortion compensation in this order is used.

The intra-receiver non-linear distortion compensation filter 161 is a filter for compensating for intra-receiver non-linear distortion. The intra-receiver non-linear distortion compensation filter 161 includes a non-linear filter arranged for each polarization. The non-linear filter included in the intra-receiver non-linear distortion compensation filter 161 is a non-linear filter whose output is expressed in a form differentiable with respect to an input and a coefficient. The intra-receiver non-linear distortion compensation filter 161 may be configured by using, for example, a DNN, a convolutional neural network (CNN), or a Volterra filter. The intra-transmitter non-linear distortion compensation filter 167 is a filter for compensating for intra-transmitter non-linear distortion. The intra-transmitter non-linear distortion compensation filter 167 includes a non-linear filter arranged for each polarization, similarly to the intra-receiver non-linear distortion compensation filter 161. The intra-receiver non-linear distortion compensation filter 161 and the intra-transmitter non-linear distortion compensation filter 167 each correspond to the non-linear distortion compensation filter 24 illustrated in FIG. 2.

Figure 5:
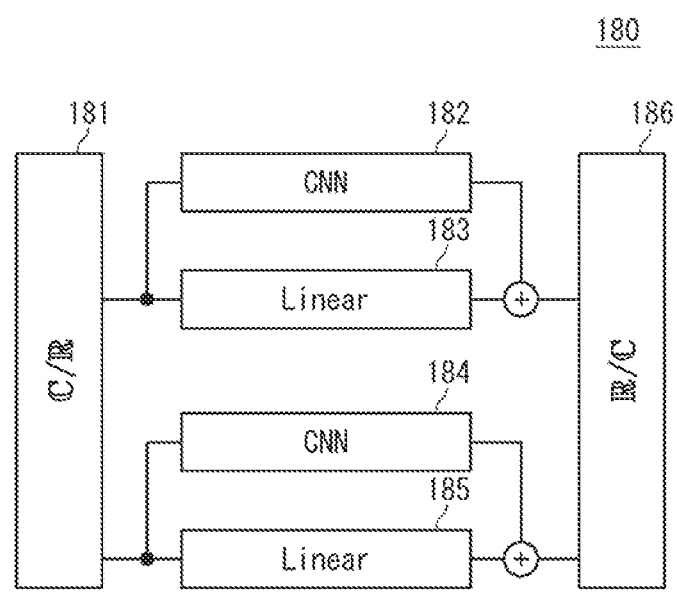
FIG. 5 is a block diagram illustrating a configuration example of a non-linear filter.

FIG. 5 illustrates a configuration example of a non-linear filter that may be used for the intra-receiver non-linear distortion compensation filter 161 and the intra-transmitter non-linear distortion compensation filter 167. The intra-receiver non-linear distortion compensation filter 161 and the intra-transmitter non-linear distortion compensation filter 167 include a non-linear filter 180 for each polarization. The non-linear filter 180 includes a signal conversion unit 181, CNNs 182 and 184, linear filters 183 and 185, and a signal conversion unit 186.

One series complex signal is input to the non-linear filter 180 associated with each polarization. The signal conversion unit 181 converts the input complex signal into two real signals of the IQ component. In a transmitter and a receiver, usually, non-linear distortion occurs independently for each IQ component. Therefore, compensation of non-linear distortion is performed for each IQ component. A signal of the I component is branched into two and input to the CNN 182 and the linear filter 183. In addition, a signal of the Q component is branched into two and input to the CNN 184 and the linear filter 185. The linear filters 183 and 185 have the same time spread as the time spread of convolution by CNNs 182 and 184, respectively. The linear filters 183 and 185 serve to help convergence of adaptive control of coefficients of CNNs 182 and 184.

A signal acquired by adding an output of the CNN 182 and an output of the linear filter 183 with respect to the signal of the I component is input to the signal conversion unit 186. In addition, a signal acquired by adding an output of the CNN 184 and an output of the linear filter 185 with respect to the signal of the Q component is input to the signal conversion unit 186. The signal conversion unit 186 converts the signal of the I component and the signal of the Q component into complex signals, and outputs the converted complex signals.

Generally, random values are selected as initial values of the coefficients inside the CNN. Therefore, the output of the CNN becomes a random value in an initial stage of the control. On the other hand, in consideration of distortion compensation in a communication system, it is usually assumed that influence of non-linear distortion is perturbed and is not large compared to other distortion. Thus, unlike image recognition, which is another common application of the CNN, in the CNN application to distortion compensation in a communication system, linear processing is considered to function as a zero order solution.

In the non-linear filter 180 illustrated in FIG. 5, initial coefficients of the linear filters 183 and 185 are not random values, but are set to appropriately selected values. In the non-linear filter 180, the outputs of the CNNs 182 and 184, and the outputs of the linear filters 183 and 185 whose initial coefficients are appropriately selected are added. In this case, the non-linear filter 180 can output a value close to a desired state to some extent from beginning of the adaptive control. Therefore, when the non-linear filter 180 as illustrated in FIG. 5 is used, a time required for convergence of the adaptive control can be shortened.

Returning to FIG. 4, the intra-receiver linear distortion compensation filter 162 is a filter for compensating for intra-receiver linear distortion. The intra-receiver linear distortion compensation filter 162 includes a WL 2×1 filter arranged for each polarization. The wavelength dispersion compensation filter 163 is a filter for performing wavelength dispersion compensation. The wavelength dispersion compensation filter 163 includes an SL filter arranged for each polarization. The polarization separation filter 164 is a filter for performing polarization variation compensation. The polarization separation filter 164 includes a 2×2 MIMO SL filter.

The carrier phase compensation filter 165 is a filter for performing carrier phase compensation. The carrier phase compensation filter 165 includes an SL filter arranged for each polarization. The intra-transmitter linear distortion compensation filter 166 is a filter for compensating for intra-transmitter linear distortion. The intra-transmitter linear distortion compensation filter 166 includes a WL 2×1 filter arranged for each polarization. The intra-transmitter linear distortion compensation filter 166 is arranged before the intra-transmitter non-linear distortion compensation filter 167. The intra-receiver linear distortion compensation filter 162 is arranged after the intra-receiver non-linear distortion compensation filter 161 and before the intra-transmitter linear distortion compensation filter 166. The intra-receiver linear distortion compensation filter 162, the wavelength dispersion compensation filter 163, the polarization separation filter 164, the carrier phase compensation filter 165, and the intra-transmitter linear distortion compensation filter 166 each correspond to the linear distortion compensation filter 25 included in the filter group 23 illustrated in FIG. 2.

Note that, in theory, the linear filters 183 and 185 used in the non-linear filter 180 illustrated in FIG. 5 can also serve as a role of the intra-receiver linear distortion compensation filter 162 and the intra-transmitter linear distortion compensation filter 166 illustrated in FIG. 4. However, due to a relationship in which the outputs of the CNNs 182 and 184 and the outputs of the linear filters 183 and 185 are added, the time spread of the linear filters 183 and 185 is necessary to match with that of the CNNs 182 and 184. Generally, the time spread of the linear distortion and the time spread of the non-linear distortion occurring in the transmitter or in the receiver are different. Therefore, even when the intra-receiver non-linear distortion compensation filter 161 or the intra-transmitter non-linear distortion compensation filter 167 includes the linear filters 183 and 185, it is preferable in design that the intra-receiver linear distortion compensation filter 162 or the intra-transmitter linear distortion compensation filter 166 is separately arranged.

In FIG. 4, the filters handled in each of the blocks are configured according to a characteristic of the distortion to be compensated by each filter. For example, accumulation of wavelength dispersion does not change when a communication path is not changed. Therefore, the filter of the wavelength dispersion compensation filter 163 can be handled statically after once the coefficient is set in response to a wavelength dispersion amount to be compensated. In addition, the wavelength dispersion is an SL process, there is little polarization dependence, and there is no mixing between polarization due to only the wavelength dispersion.

For this reason, the filter of the wavelength dispersion compensation filter 163 is an SL filter that does not have a cross term between polarization and is independent of each polarization.

In contrast, since intra-receiver linear distortion, i.e., intra-receiver IQ distortion, is a WL process, the filter of the intra-receiver linear distortion compensation filter 162 is a WL filter. Since the intra-receiver IQ distortion usually does not cause mixing between polarization, a 2×1 WL filter being independent of each polarization is used for the intra-receiver linear distortion compensation filter 162. When it is supposed that a receiver having a configuration in which mixing between polarization is suggested to occur in the intra-receiver IQ distortion is used, a 4×2 WL filter having a cross term between polarization is used in the intra-receiver linear distortion compensation filter 162.

Note that, in the above description, an example in which the equalization unit 154 includes the intra-receiver non-linear distortion compensation filter 161, the intra-receiver linear distortion compensation filter 162, the wavelength dispersion compensation filter 163, the polarization separation filter 164, the carrier phase compensation filter 165, the intra-transmitter linear distortion compensation filter 166, and the intra-transmitter non-linear distortion compensation filter 167 has been described. However, the filter included in the equalization unit 154 is not limited to the filter described above. For example, when there is a factor occurring distortion other than the distortion described above, the equalization unit 154 may further include a filter for compensating for the distortion. In that case, the filter is inserted in an appropriate position, considering an order in which the distortion occurs. Alternatively, some of the filters described above can be omitted in the equalization unit 154. As an example, the equalization unit 154 may include a coefficient-fixed matched filter after the intra-transmitter non-linear distortion compensation filter 167. In that case, the filter block in the final stage may be a coefficient-fixed matched filter.

The loss function calculation unit 172 calculates magnitude of a difference from a desired state of an output signal of the intra-transmitter non-linear distortion compensation filter 167, which is the output of the final filter block, as a loss function. The coefficient updating unit 170 adaptively controls the filter coefficients of the filter blocks other than the wavelength dispersion compensation filter 163 and the carrier phase compensation filter 165, which can be handled statically. That is, the coefficient updating unit 170 adaptively controls the filter coefficient of each filter block of the intra-receiver non-linear distortion compensation filter 161, the intra-receiver linear distortion compensation filter 162, the polarization separation filter 164, the intra-transmitter linear distortion compensation filter 166, and the intra-transmitter non-linear distortion compensation filter 167. The coefficient updating unit 170 updates the coefficient of each filter block by calculating a gradient in each filter block, by using the error back propagation method, as a loss function to minimize a loss function calculated by the loss function calculation unit 172. The coefficient updating unit 170 corresponds to the coefficient updating unit 26 illustrated in FIG. 2.

Herein, in the intra-receiver non-linear distortion compensation filter 161, the intra-receiver linear distortion compensation filter 162, the wavelength dispersion compensation filter 163, the polarization separation filter 164, the carrier phase compensation filter 165, the intra-transmitter linear distortion compensation filter 166, and the intra-transmitter non-linear distortion compensation filter 167, the output of each filter block can be differentiated with respect to an input and a coefficient. Therefore, the coefficient updating unit 170 can sequentially calculate the gradient for the loss function of the coefficient from the final layer, by using the error back propagation method. For example, the coefficient updating unit 170 uses the magnitude of the difference from the desired state of the final output as a loss function, and updates the filter coefficient of each filter block, by using a stochastic gradient descent method, in such a way as to minimize average magnitude of the loss function.

The PLL 171 determines a phase rotation amount of the carrier phase compensation filter 165, based on the output of the intra-transmitter non-linear distortion compensation filter 167, which is the final output of the filter block. The coefficient of the carrier phase compensation filter 165 is controlled by the PLL 171.

Figure 6:
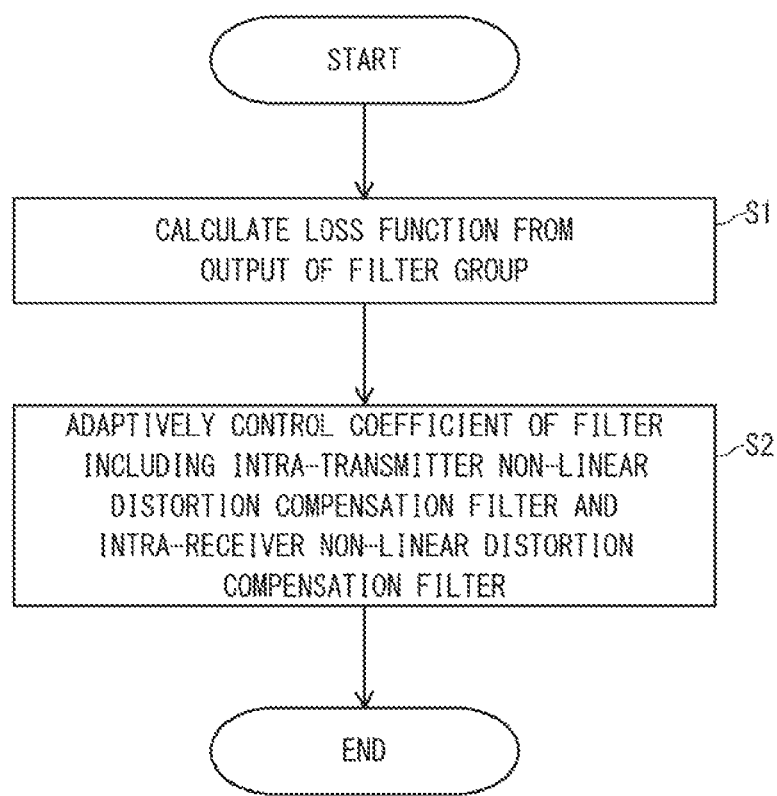
FIG. 6 is a flowchart illustrating an operation procedure of the equalization unit.

An operation procedure will be described. FIG. 6 illustrates an operation procedure (equalization signal processing method) of the equalization unit 154. The loss function calculation unit 172 calculates a loss function, based on a difference between an output signal being output from the intra-transmitter non-linear distortion compensation filter 167, which is a final filter block of a plurality of filter blocks connected in series, and a desired value of the output signal (step S1). The coefficient updating unit 170 adaptively controls the filter coefficients of the intra-receiver non-linear distortion compensation filter 161, the intra-receiver linear distortion compensation filter 162, the polarization separation filter 164, the intra-transmitter linear distortion compensation filter 166, and the intra-transmitter non-linear distortion compensation filter 167, based on the loss function, by using the error back propagation method (step S2). Apart from the above, the PLL 171 controls the coefficient of the carrier phase compensation filter 165 by using the output signal output from the intra-transmitter non-linear distortion compensation filter 167.

Hereinafter, the operation of the equalization unit 154 according to the present example embodiment will be described in detail. In the following description, it is considered that the FIR filter is used as all of the filters of each block, including a filter convolved by the CNN. In general, it is considered that, in the filter group, L-layer filters are connected in series. In a case of the example in FIG. 4, L=7.

An output (output vector) of the filter in an l-th stage ($1 \leq l \leq L$) at time k (k is an integer) is denoted by $u_i^{[l]}[k]$, and an input (input vector) is denoted by $u_i^{[l-1]}[k]$. i and j each represent the polarization thereof. The following description can be easily extended to a case of a spatial multiplex transmission or the like by extending an allowable range of i to twice of the number of modes. In a case where it is assumed that lengths of the input vector and the output vector are $M_{in}^{[l]}$ and $M_{out}^{[l]}$, respectively, the output vector $u_i^{[l]}[k]$ and the input vector $u_i^{[l-1]}[k]$ are represented by equations 1 and 2 below, respectively.

$$u_i^{[l]}[k] = (u_i^{[l]}[k], u_i^{[l]}[k-1], \ldots, u_i^{[l]}[k-M_{out}^{[l]}+1])^T \quad (1)$$

$$u_i^{[l-1]}[k] = (u_i^{[l-1]}[k], u_i^{[l-1]}[k-1], \ldots, u_i^{[l-1]}[k-M_{in}^{[l]}+1])^T \quad (1)$$

In the above equation, [T] represents transposition. In the above equation, each component of the vector is a complex signal.

Regarding the number of taps $M^{[l]}$ of a filter in the l-th stage, from a characteristic of convolution, the following can be said.

$$M^{[l]} = M_{in}^{[l]} - M_{out}^{[l]} + 1 \quad (3)$$

When the filter in the l-th stage is an SL MIMO filter, the FIR filter coefficient (coefficient vector) $h_{ij}^{[l]}$ of the $M^{[l]}$ taps is represented by an equation 4 below.

$$h_{ij}^{[l]} = (h_{ij}^{[l]}[0], h_{ij}^{[l]}[1], \ldots, h_{ij}^{[l]}[M^{[l]}-1])^T \quad (4)$$

When the input (input vector) of the filter in the l-th stage is as follows, $$\overline{u}_i^{[l-1]}[k] = (u_i^{[l-1]}[k], u_i^{[l-1]}[k-1], \ldots, u_i^{[l-1]}[k-M^{[l]}+1])^T \quad (5)$$

an output sample can be said as the following.

$$u_i^{(l)}[k] = \sum_{j=1}^{2} h_{ij}^{(l)\dagger} \overline{u}_j^{[l-1]}[k] \quad (6)$$

In the above equation, [*] represents Hermite conjugate. Therefore, the following can be said.

$$u_i^{(l)}[k] = \sum_{j=1}^{2} H_{ij}^{(l)*} u_j^{[l-1]}[k] \quad (7)$$

In an equation 7, [*] represents a complex conjugate. The $H_{ij}^{[l]}$ is represented by an equation 8 below.

$$H_{ij}^{(l)} = \begin{pmatrix} h_{ij}^{(l)}[0] & h_{ij}^{(l)}[1] & \ldots & h_{ij}^{(l)}[M^{(l)}-1] & 0 & \ldots & 0 \\ 0 & \ddots & \ddots & & \ddots & \ddots & \vdots \\ \vdots & & & & & & 0 \\ 0 & \ldots & 0 & h_{ij}^{(l)}[0] & h_{ij}^{(l)}[1] & \ldots & h_{ij}^{(l)}[M^{(l)}-1] \end{pmatrix} \quad (8)$$

When the above equation 7 is transformed, an equation 9 below is acquired.

$$u_i^{(l)}[k] = \sum_{j=1}^{2} U_j^{(l-1)}[k] h_{ij}^{(l)*} \quad (9)$$

In the above equation 9, the $U_j^{[l-1]}$ can be said as following.

$$U_j^{[l-1]} = \begin{pmatrix} u_j^{[l-1]}[k] & u_j^{[l-1]}[k-1] & \ldots & u_j^{[l-1]}[k-M^{[l]}+1] \\ u_j^{[l-1]}[k-1] & u_j^{[l-1]}[k-2] & \ldots & u_j^{[l-1]}[k-M^{[l]}] \\ \vdots & & & \vdots \\ u_j^{[l-1]}[k-M_{out}^{[l]}+1] & u_j^{[l-1]}[k-M_{out}^{[l]}] & \ldots & u_j^{[l-1]}[k-M_{in}^{[l]}+1] \end{pmatrix} \quad (10)$$

In the equation 9, by replacing a sum for j with j=i, this also includes a case of a 1×1 SL filter for each polarization.

When the filter in the l-th stage is a WL MIMO filter, $h_{ij}^{[l]}$ represented by the equation 4 and $h_{*ij}^{[l]}$ represented by an equation 11 below are filter coefficients (coefficient vectors).

$$h_{*ij}^{[l]} = (h_{*ij}^{[l]}[0], h_{*ij}^{[l]}[1], \ldots, h_{*ij}^{[l]}[M^{[l]}-1])^T \quad (11)$$

The output sample becomes the following.

$$u_i^{(l)}[k] = \sum_{j=1}^{2} h_{ij}^{(l)\dagger} \overline{u}_j^{[l-1]}[k] + \sum_{j=1}^{2} h_{*ij}^{(l)\dagger} \overline{u}_j^{[l-1]*}[k] \quad (12)$$

Similarly to the above, when $H_{*ij}^{[l]}$ is as follows, $$H_{*ij}^{(l)} = \begin{pmatrix} h_{*ij}^{(l)}[0] & h_{*ij}^{(l)}[1] & \ldots & h_{*ij}^{(l)}[M^{(l)}-1] & 0 & \ldots & 0 \\ 0 & \ddots & \ddots & & \ddots & \ddots & \vdots \\ \vdots & & & & & & 0 \\ 0 & \ldots & 0 & h_{*ij}^{(l)}[0] & h_{*ij}^{(l)}[1] & \ldots & h_{*ij}^{(l)}[M^{(l)}-1] \end{pmatrix} \quad (13)$$

the following can be said.

$$u_i^{(l)}[k] = \sum_{j=1}^{2} H_{ij}^{(l)*} u_j^{[l-1]}[k] + \sum_{j=1}^{2} H_{*ij}^{(l)*} u_j^{[l-1]*}[k]$$
$$= \sum_{j=1}^{2} U_j^{(l-1)}[k] h_{ij}^{[l]} + \sum_{j=1}^{2} U_j^{(l-1)}[k] h_{*ij}^{[l]*} \quad (14)$$

This also includes a case of a 2×1 WL filter for each polarization.

When the filter in the l-th stage is a non-linear filter having the configuration illustrated in FIG. 5, an input of the non-linear filter converted into a real signal of the IQ component is as follows.

$$x_i[k] = (x_i[k], x_i[k-1], \ldots, x_i[k-M_{in}^{[l]}+1])^T \quad (15)$$

Herein, i is i=1, 2, 3, and 4, and each is equivalent to the I component and the Q component of the X polarization, and the I component and the Q component of the Y polarization, respectively. For example, the following can be said.

$$x_i[k] = \text{Re}[u_i^{l-1}[k]] \quad (16)$$

In the above equation 16, Re represents a real part. The output $y_i[k]$ of the non-linear filter converted into a real signal of the IQ component is as follows.

$$y_i[k] = (y_i[k], y_i[k-1], \ldots, y_i[k-M_{out}^{[l]}+1])^T \quad (17)$$

Similarly to the input of the non-linear filter, i is i=1, 2, 3, and 4, and each is equivalent to the I component and Q component of the X polarization, and the I component and Q component of the Y polarization, respectively.

Herein, focusing on any of the components j=1, 2, 3, and 4, and a non-linear filter to be applied to the component will be considered. The CNN is as P-layer, and an input of p-layer (1≤p≤P) of the CNN is as follows.

$$x_i^{(p-1)}[k] = (x_i^{(p-1)}[k], x_i^{(p-1)}[k-1], \ldots, x_i^{(p-1)}[k-M_{in}^{(p)}+1])^T \quad (18)$$

For the input of p=first layer of the CNN, the following can be said.

$$x_i^{(0)}[k] = x_j[k] \quad (19)$$

In the CNN, since the non-linear filter is applied independently for each polarization and each IQ component, i=1. Note that, it can be easily extended when the non-linear filter includes a cross term instead of being applied independently.

The output of the p-th layer of the CNN is as follows.

$$x_i^{(p)}[k] = (x_i^{(p)}[k], x_i^{(p)}[k-1], \ldots, x_i^{(p)}[k-M_{out}^{(p)}+1])^T \quad (20)$$

In an intermediate layer of the CNN, i=1 is not required, and i=1, 2, ..., $N^{(p)}$ with the number of filters of the p-th layer as the $N^{(p)}$.

The output of the p=P-th layer, which is the final layer of the CNN, is represented as follows.

$$x_i^{(P)}[k] = y_i^{(CNN)}[k] \quad (21)$$

In the final P-th layer of the CNN, i=1. An activation function of the p-th layer of the CNN is defined as $g^{(p)}$. For example, the $g^{(p)}$ is a rectified linear unit (ReLU) except for the final P-th layer, and is a linear function (Linear) in the final P-th layer. Between the input and the output of the p-th layer of the CNN, the following relationship holds.

$$z_i^{(p)}[k] = \sum_{j=1}^{N^{(p)}} H_{ij}^{(p)} x_j^{(p-1)}[k] + b_i^{(p)} 1 \quad (22)$$

$$x_i^{(p)}[k] = g^{(p)}(z_i^{(p)}[k]) \quad (23)$$

When the $g^{(p)}$ is the linear function, the following can be said.

$$g^{(p)}(z_i^{(p)}[k-n]) = z_i^{(p)}[k-n] \quad (24)$$

When the $g^{(p)}$ is the ReLU, the following can be said.

$$g^{(p)}(z_i^{(p)}[k-n]) = \max(z_i^{(p)}[k-n], 0) \quad (25)$$

Herein, "1" in the equation 22 is a vector having an appropriate size and all components with 1. In addition, the equation 22 can also be represented as follows.

$$z_i^{(p)}[k] = \sum_{j=1}^{N^{(p)}} X_j^{(p-1)}[k] h_{ij}^{(p)} + b_i^{(p)} 1 \quad (26)$$

The $h_{ij}^{(p)}$ and $b_i^{(p)}$ constituting the $H_{ij}^{(p)}$ are the filter coefficients of the p-th layer of the CNN. The $h_{ij}^{(p)}$ is the number of taps $M^{(p)}$, and $M^{(p)} = M_{in}^{(p)} - M_{out}^{(p)} + 1$. By sequentially calculating this from the first layer of the CNN, $y_i^{(CNN)}[k] = x_i^{(P)}[k]$ is acquired.

The output of the linear filter to be added to the output of the CNN is as $y_i^{(L)}[k]$ The output $y_i^{(L)}[k]$ of the linear filter is as follows.

$$y_i^{(L)}[k] = \sum_j H_{ij}^{(L)} x_j^{(L)}[k] \quad (27)$$

Herein, a sum for j is not necessary when the non-linear filter is independently performed for each polarization and each IQ component, and $x_j^{(L)}[k] = x_j[k]$ for j being focused first. $h_{ij}^{(L)}$ constituting $H_{ij}^{(L)}$ is the coefficient of the linear filter. The number of taps in the linear filter is as follows in such a way as to be similar to the number of taps in the CNN.

$$M^{(L)} = 1 - P + \sum_{p=1}^{P} M^{(p)} \quad (28)$$

A sum $y_i^{(CNN)}[k] + y_i^{(L)}[k]$ of the output of the CNN and the output of the linear filter corresponds to the following regarding any of j=1 to j=4 being focused first.

$$y_i[k] = y_i^{(CNN)}[k] + y_i^{(L)}[k] \quad (29)$$

The output of the filter of the final L-th layer can be calculated by sequentially applying the input-output relationship of the various filters described above from the input. The filter output (output vector) of the final L-th layer is $u_i^{[L]}[k]$, where $M_{out}^{[L]} = 1$. Therefore, from the equation 1, the following can be said.

$$u_i^{[L]}[k] = u_i^{[L]}[k] \quad (30)$$

In the present example embodiment, a loss function φ is constructed from the final filter output. The loss function can be constructed in a manner such as a CMA or a DDLMS. For example, in a case of a normal CMA, k is a symbol timing, r is a desired value (predetermined value) of an amplitude of a filter output, and then an expected value <φ[k]> of magnitude of an error from the desired value r of the filter output is as a loss function. Herein <•> represents an expected value. An instantaneous value φ[k] of the loss function is as follows.

$$\phi[k] = \sum_{i=1}^{2} (r^2 - |u_i^{[L]}[k]|^2)^2 \quad (31)$$

The coefficient updating unit 170 (refer to FIG. 4) controls all the filter coefficients of the filter blocks being adaptively controlled from the first layer to the L-th layer in such a way as to minimize the loss function <φ[k]>. The coefficient updating unit 170 controls the filter coefficients of each filter block by using the stochastic gradient descent method. The stochastic gradient descent method is a method in which control of the coefficient is repeated in such a way as to minimize the instantaneous value of the loss function, based on the gradient of the coefficient of the instantaneous value φ[k] of the loss function.

In the stochastic gradient descent method, the loss function to be minimized is φ=φ[k]. For a certain coefficient 4, the coefficient update by the stochastic gradient descent method is represented as follows.

$$\xi^* \rightarrow \xi^* - 2\alpha \frac{\partial \phi}{\partial \xi} \quad (32)$$

In the above equation 32, α is a step size for determining strength of the coefficient update. The gradient of the loss function φ for all filter coefficients can be calculated by the error back propagation method as described below.

When a loss function of the CMA is used for the output of the final stage of the filter, the following can be said.

$$\frac{\partial \phi}{\partial y_i[k]} = -2e_i u_i^{[L]*}[k] \quad (33)$$

$$\frac{\partial \phi}{\partial y_i^*[k]} = -2e_i u_i^{[L]}[k] \quad (34)$$

$$e_i = r^2 - |u_i^{[L]}[k]|^2 \quad (35)$$

This is a gradient with respect to the filter output in the L-th stage being the final stage of the loss function. From the gradient of the loss function with respect to the output of the filter in the l-th stage, the filter coefficient of the l-th stage of the loss function, and the gradient with respect to the filter input, i.e., the output of the filter in l−1st stage, can be calculated.

When the filter in the l-th stage is an SL MIMO filter, calculation of differentiation results as follows.

$$\frac{\partial \phi}{\partial h_{ij}^{[l]}} = U_j^{[l-1]\dagger}[k]\frac{\partial \phi}{\partial u_i^{[l]*}[k]} \quad (36)$$

$$\frac{\partial \phi}{\partial u_j^{[l-1]}[k]} = \sum_{i=1}^{2} H_{ij}^{[l]\dagger}\frac{\partial \phi}{\partial u_i^{[l]}[k]} \quad (37)$$

$$\frac{\partial \phi}{\partial u_j^{[l-1]*}[k]} = \sum_{i=1}^{2} H_{ij}^{[l]T}\frac{\partial \phi}{\partial u_i^{[l]*}[k]} \quad (38)$$

When the filter in the l-th stage is a WL MIMO filter, calculation of the differentiation results as follows.

$$\frac{\partial \phi}{\partial h_{ij}^{[l]}} = U_j^{[l-1]\dagger}[k]\frac{\partial \phi}{\partial u_i^{[l]*}[k]} \quad (39)$$

$$\frac{\partial \phi}{\partial h_{*ij}^{[l]}} = U_j^{[l-1]T}[k]\frac{\partial \phi}{\partial u_i^{[l]*}[k]} \quad (40)$$

$$\frac{\partial \phi}{\partial u_j^{[l-1]}[k]} = \sum_{i=1}^{2}\left(H_{ij}^{[l]\dagger}\frac{\partial \phi}{\partial u_i^{[l]}[k]} + H_{*ij}^{[l]T}\frac{\partial \phi}{\partial u_i^{[l]*}[k]}\right) \quad (41)$$

$$\frac{\partial \phi}{\partial u_j^{[l-1]*}[k]} = \sum_{i=1}^{2}\left(H_{*ij}^{[l]\dagger}\frac{\partial \phi}{\partial u_i^{[l]}[k]} + H_{ij}^{[l]T}\frac{\partial \phi}{\partial u_i^{[l]*}[k]}\right) \quad (42)$$

When the filter in the l-th stage is the non-linear filter having the configuration illustrated in FIG. 5, the differentiation with respect to the output of the non-linear filter converted into the real signal of the IQ component is as follows, based on the differentiation of Wirtinger.

$$\frac{\partial \phi}{\partial y_{2i-1}[k]} = \frac{\partial \phi}{\partial u_i^{[l]}[k]} + \frac{\partial \phi}{\partial u_i^{[l]*}[k]} \quad (43)$$

$$\frac{\partial \phi}{\partial y_{2i}[k]} = i\left(\frac{\partial \phi}{\partial u_i^{[l]}[k]} - \frac{\partial \phi}{\partial u_i^{[l]*}[k]}\right) \quad (44)$$

Herein, i=1, 2. The differentiation with respect to the input of the non-linear filter converted into the real signal of the IQ component has the following relationship with the differentiation with respect to the filter input in the l-th stage.

$$\frac{\partial \phi}{\partial u_i^{[l-1]}[k]} = \frac{1}{2}\left(\frac{\partial \phi}{\partial x_{2i-1}[k]} - i\frac{\partial \phi}{\partial x_{2i}[k]}\right) \quad (45)$$

$$\frac{\partial \phi}{\partial u_i^{[l-1]*}[k]} = \frac{1}{2}\left(\frac{\partial \phi}{\partial x_{2i-1}[k]} + i\frac{\partial \phi}{\partial x_{2i}[k]}\right) \quad (46)$$

The differentiation with respect to the outputs $y_i^{(CNN)}[k]$ and $y_i^{(L)}[k]$ of the CNN is as follows.

$$\frac{\partial \phi}{\partial y_i^{(CNN)}[k]} = \frac{\partial \phi}{\partial y_i^{(L)}[k]} = \frac{\partial \phi}{\delta y_i[k]} \quad (47)$$

Herein, i=1, . . . , 4.

The differentiation with respect to the output of the final P-th layer of the CNN is as follows.

$$\frac{\partial \phi}{\partial x_i^{(p)}[k]} = \frac{\partial \phi}{\partial y_i^{(CNN)}[k]} \quad (48)$$

A relationship between the differentiation with respect to the output of the p-th layer of the CNN, and the differentiation with respect to the coefficient of the p-th layer and the input of the p-th layer can be derived as follows.

$$\frac{\partial \phi}{\partial z_i^{(p)}[k-n]} = \frac{\partial \phi}{\partial x_i^{(p)}[k-n]}\frac{\partial x_i^{(p)}[k-n]}{\partial z_i^{(p)}[k-n]} \quad (49)$$

When the $g^{(p)}$ is the Linear, an equation 50 below holds.

$$\frac{\partial x_i^{(p)}[k-n]}{\partial z_i^{(p)}[k-n]} = 1 \quad (50)$$

When the $g^{(p)}$ is the ReLU, an equation 51 below holds.

$$\frac{\partial x_i^{(p)}[k-n]}{\partial z_i^{(p)}[k-n]} = \begin{cases} 1(z_i^{(p)}[k-n] \geq 0) \\ 0(z_i^{(p)}[k-n] < 0) \end{cases} = \chi(z_i^{(p)}[k-n]) \quad (51)$$

In the equation 51, $\chi$ represents a step function.

By repeatedly applying equations 52 to 54 below, all the coefficients of the CNN and the differentiation $\partial\phi/\partial x_j^{(0)}[k]$ for the input of the CNN can be acquired.

$$\frac{\partial \phi}{\partial h_{ij}^{(p)}} = X_j^{(p-1)T}[k]\frac{\partial \phi}{\partial z_i^{(p)}[k]} \quad (52)$$

$$\frac{\partial \phi}{\partial b_i^{(p)}} = \sum_{n=1}^{M^{(p)}} \frac{\partial \phi}{\partial z_i^{(p)}[k-n]} \quad (53)$$

$$\frac{\partial \phi}{\partial x_j^{(p-1)}[k]} = \sum_{i=1}^{N^{(p)}} H_{ij}^{(p)T}\frac{\partial \phi}{\partial z_i^{(p)}[k]} \quad (54)$$

Regarding the linear filter, the following can be said.

$$\frac{\partial \phi}{\partial h_{ij}^{(L)}} = X_j^{(L)T}[k]\frac{\partial \phi}{\partial y_i^{(L)}[k]} \quad (55)$$

$$\frac{\partial \phi}{\partial x_j^{(L)}[k]} = \sum_{i} H_{ij}^{(L)T}\frac{\partial \phi}{\partial y_i^{(L)}[k]} \quad (56)$$

From the above, the differentiation with respect to the input of the non-linear filter can be calculated by an equation 57 below.

$$\frac{\partial \phi}{\partial x_j[k]} = \frac{\partial \phi}{\partial x_j^{(0)}[k]} + \frac{\partial \phi}{\partial x_j^{(L)}[k]} \quad (57)$$

By applying the error back propagation for the various filters described above sequentially from the final layer, the gradients for all coefficients can be calculated up to the filter of the first layer. As a result, the filter coefficients of each filter block can be updated.

In the configuration illustrated in FIG. 4, the filter coefficient of the wavelength dispersion compensation filter 163 is determined from an accumulated wavelength dispersion amount D to be compensated, by using an equation 58 below.

$$H_{CD}(\omega) = \exp\left(i\frac{\lambda^2}{4\pi c}D\omega^2\right) \quad (58)$$

In the equation 58, $\lambda$ is a wavelength of an optical signal, and c is a speed of light. For the carrier phase compensation filter 165, the coefficient is determined using an equation 59 below.

$$h_{CPEi} = \exp(-i\theta_i[k]) \quad (59)$$

In the equation 59, $\theta_i[k]$ is determined by the PLL 171, based on the output of the filter in the final stage, as described above.

As described above, the filter coefficient of the filter block being adaptively controlled can be updated in such a way as to bring the output of the filter block in the final stage closer to a desired state. Accordingly, in an optical fiber communication system including non-linear distortion occurring in a transmitter and a receiver, it is possible to perform reception side equalization signal processing for compensating for various pieces of distortion.

In order to verify an effect of the reception side equalization signal processing for compensating for various pieces of distortion, the present inventor performs simulation. In the simulation, a single mode fiber 100 km transmission of a 32 Gbaud polarization multiplexed 16QAM signal is simulated.

In the simulation, non-linear distortion of an a sin(bx) type is applied in the transmitter assuming a characteristic of a Mach-Zehnder optical modulator. In the receiver, non-linear distortion of an a tanh(bx) type is applied assuming clipping. A root Nyquist filter with a roll-off rate of 0.1 is applied to the transmission side and the reception side. A polarization variation and linear IQ distortion in the transmitter and the receiver are not applied. A reception optical signal-to-noise ratio (OSNR) is set to 30 dB/0.1 nm. The reception side equalization signal processing method is applied to the reception signal sampled by the double oversampling. A loss function is constructed by the DALMS.

As simulation conditions, four conditions are considered: no distortion in the transmitter/receiver (no NL), non-linear distortion in the transmitter (Tx NL), non-linear distortion in the receiver (Rx NL), and non-linear distortion in the transmitter/receiver (both NL). In the simulation, for each condition, magnitude of error vector magnitude (EVM) of the output when the following four types of reception side equalization signal processing are performed is evaluated.

Figure 10:
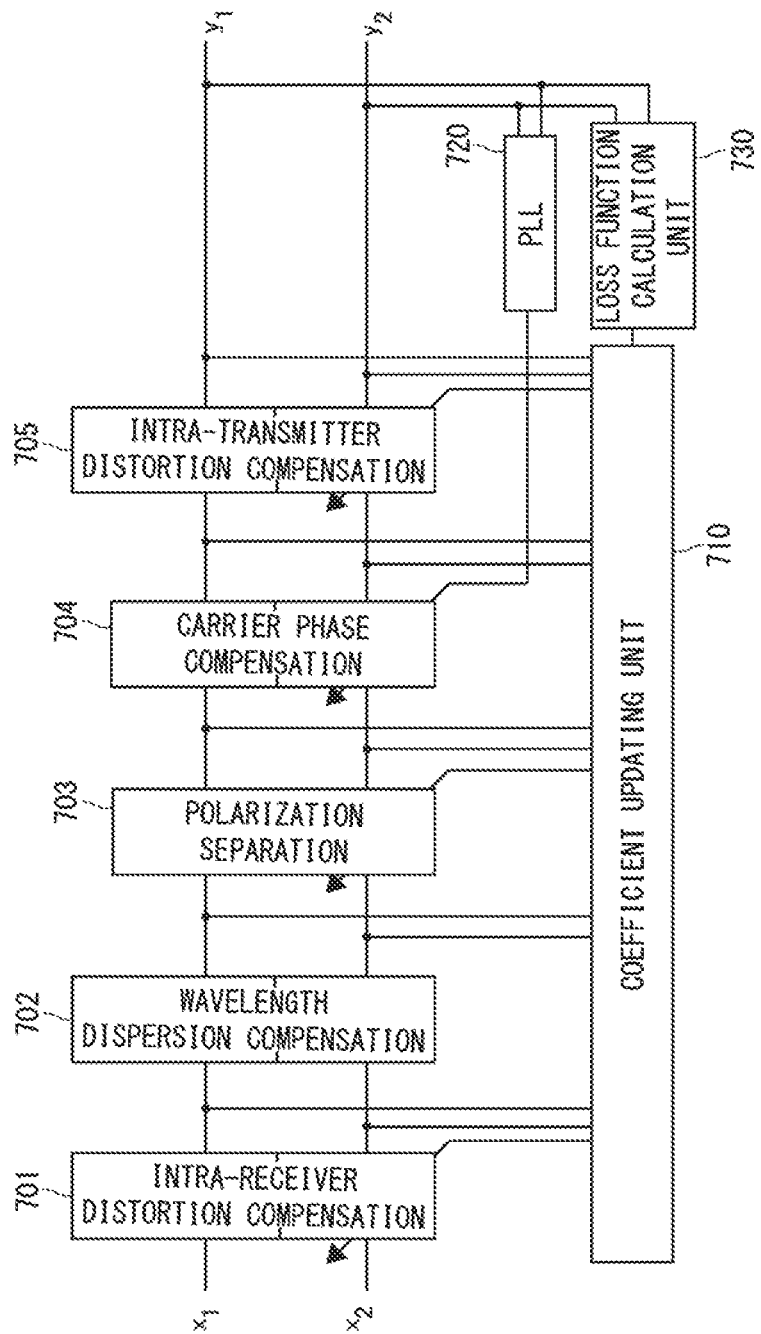
FIG. 10 is a block diagram illustrating an adaptive multi-layer filter for performing equalization signal processing.
Figure 11:
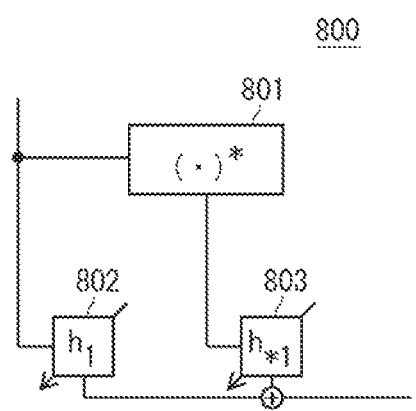
FIG. 11 is a block diagram illustrating a WL 2×1 filter.
Figure 12:
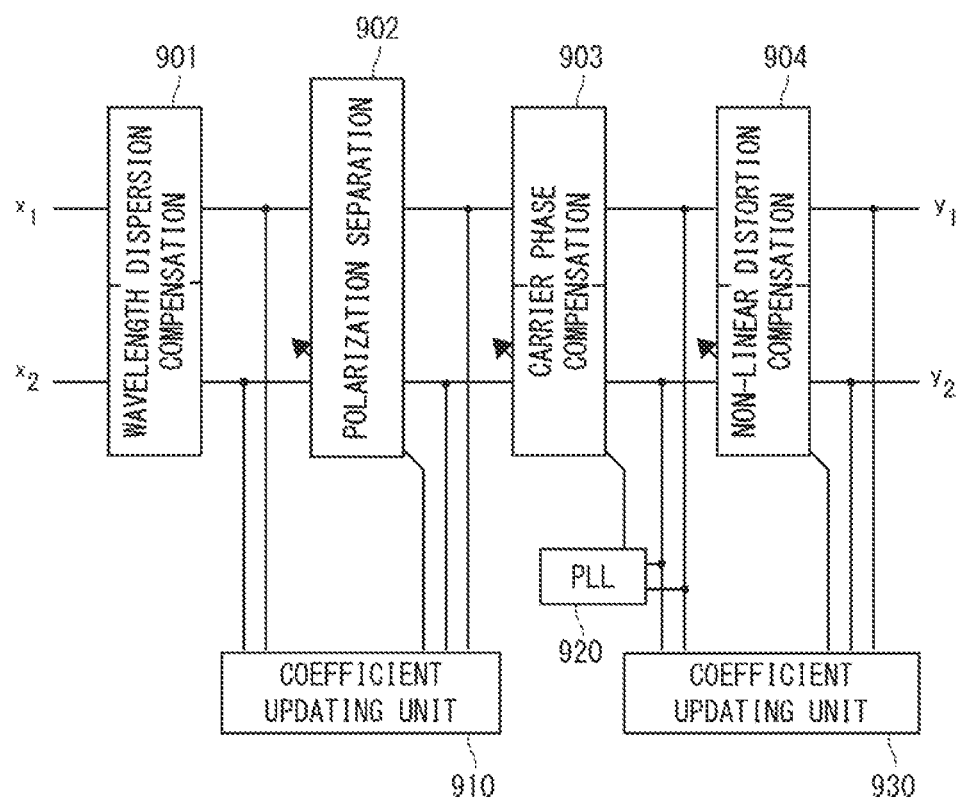
FIG. 12 is a block diagram illustrating an example of reception side digital signal processing.

Reception side equalization signal processing that does not compensate for non-linear distortion in the transmitter and the receiver, being equivalent to the configuration illustrated in FIG. 10 (Linear)

In the configuration in FIG. 4, the reception side equalization signal processing in a configuration in which the intra-transmitter non-linear distortion compensation filter 167 is arranged but the intra-receiver non-linear distortion compensation filter 161 is not arranged (Tx CNN)

In the configuration in FIG. 4, the reception side equalization signal processing in a configuration in which the intra-receiver non-linear distortion compensation filter 161 is arranged but the intra-transmitter non-linear distortion compensation filter 167 is not arranged (Rx CNN)

In the configuration in FIG. 4, the reception side equalization signal processing in a configuration in which both the intra-receiver non-linear distortion compensation filter 161 and the intra-transmitter non-linear distortion compensation filter 167 are arranged (both CNN)

Figure 7:
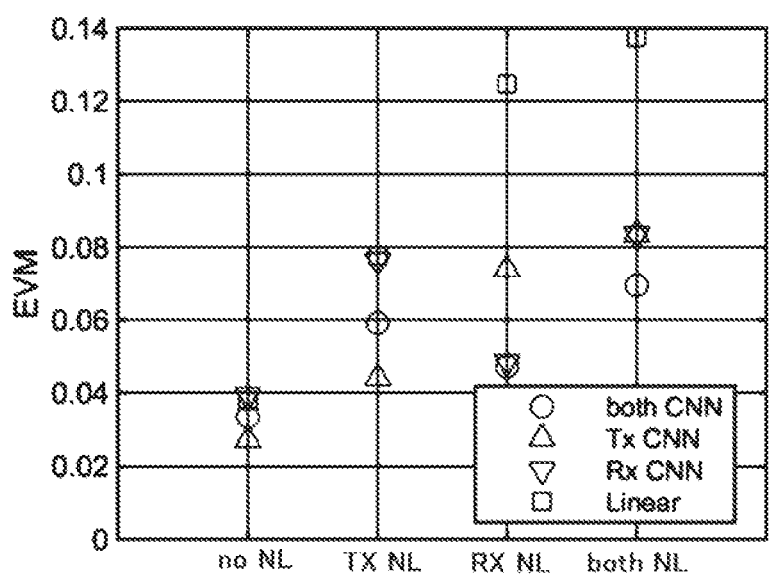
FIG. 7 is a graph illustrating a simulation result.
Figure 8:
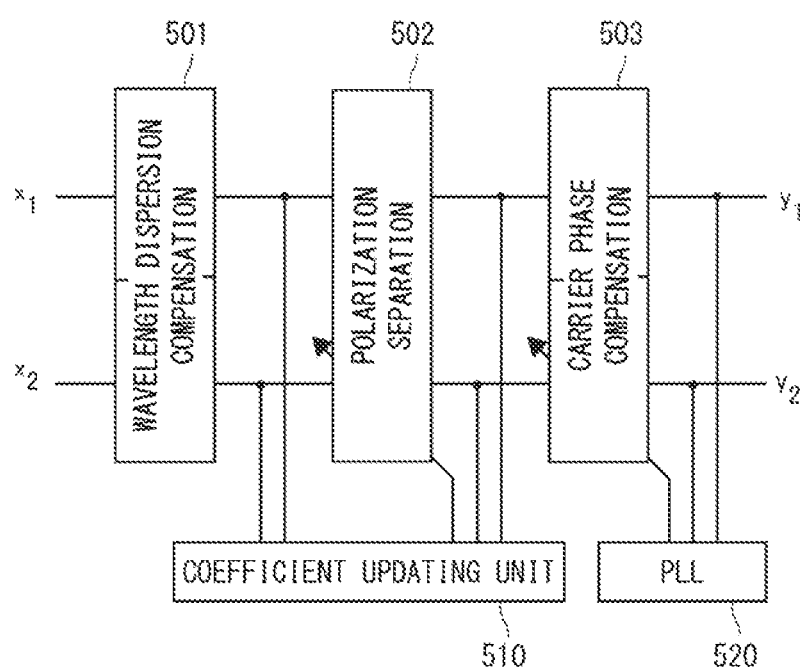
FIG. 8 is a block diagram illustrating an example of reception side equalization digital signal processing described in Non Patent Literature 1.
Figure 9:
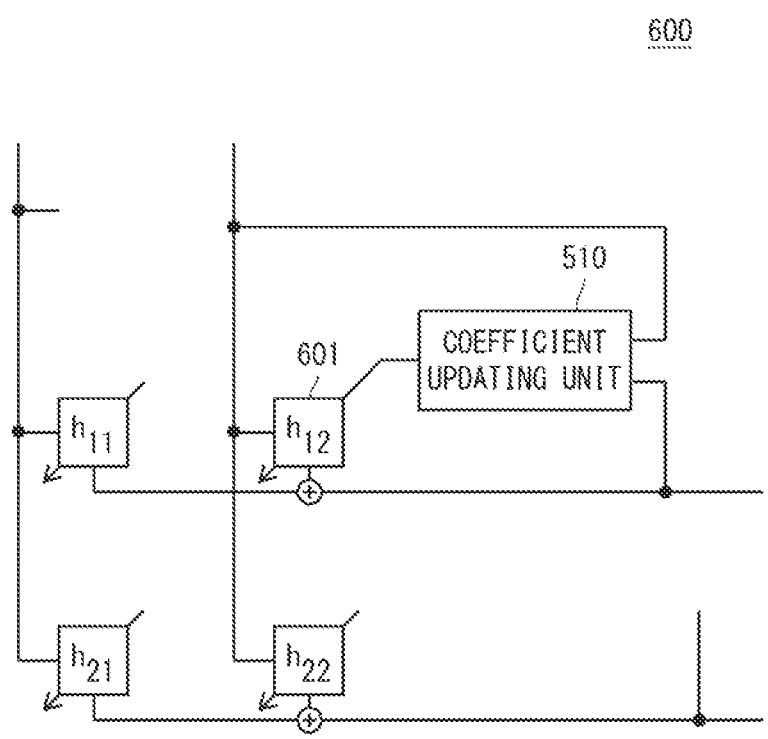
FIG. 9 is a block diagram illustrating a 2×2 MIMO filter.

FIG. 7 illustrates simulation results. In a graph illustrated in FIG. 7, a vertical axis represents EVM. The EVM represents a vector difference at a predetermined time between an ideal transmission signal and the measured reception signal, and the smaller the value, the better performance of the equalization signal processing. Referring to the graph illustrated in FIG. 7, it can be seen that the EVM is improved in cases of Tx CNN, Rx CNN, and both CNN as compared with a case of Linear. In this manner, it is confirmed from the simulation results that it is possible to compensate for the non-linear distortion occurring in the transmitter and/or the receiver.

Note that, in the above example embodiment, an example in which the equalization unit 154 includes both the intra-receiver non-linear distortion compensation filter 161 and the intra-transmitter non-linear distortion compensation filter 167 has been described. In the above example embodiment, the equalization unit 154 may have only one filter for compensating for the non-linear distortion. For example, it may be known that either non-linear distortion in a transmitter or non-linear distortion in a receiver has a small influence on a reception signal. In such a case, the equalization unit 154 may be configured to include either the intra-receiver non-linear distortion compensation filter 161 or the intra-transmitter non-linear distortion compensation filter 167, such as Tx CNN or Rx CNN described above. Even in this case, by adaptively controlling the coefficients of the filters constituting the filter group by using the output signal of the filter in the final stage of the filter group, it is possible to achieve high-accuracy distortion compensation.

Figure 13:
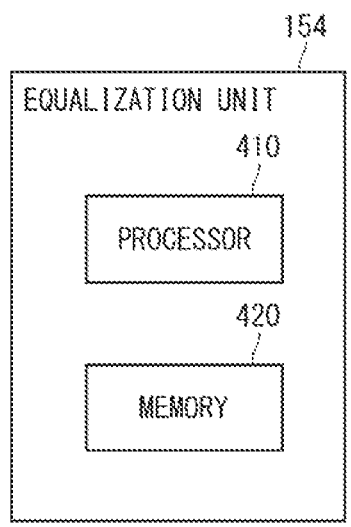
FIG. 13 is a block diagram illustrating an example of configuration of a reception side digital signal processing.

In the above example embodiment, the equalization unit 154 may be configured as any digital signal processing circuit. For example, the equalization unit 154 may be configured as a circuit including at least one processor 410 and at least one memory 420 as shown in FIG. 13. In this case, the processor 410 included in the equalization unit 154 may read a program stored in the memory 420, and thereby perform the reception side equalization signal processing.

The above program includes instructions (or software codes) that, when loaded into a computer, cause the computer to perform one or more of the functions described in the embodiments. The program may be stored in a non-transitory computer readable medium or a tangible storage medium. By way of example, and not a limitation, non-transitory computer readable media or tangible storage media can include a random-access memory (RAM), a read-only memory (ROM), a flash memory, a solid-state drive (SSD) or other types of memory technologies, a Compact Disc (CD), a digital versatile disc (DVD), a Blu-ray disc or other types of optical disc storage, and magnetic cassettes, magnetic tape, magnetic disk storage or other types of magnetic storage devices. The program may be transmitted on a transitory computer readable medium or a communication medium. By way of example, and not a limitation, transitory computer readable media or communication media can include electrical, optical, acoustical, or other forms of propagated signals.

A communication system, a receiver, an equalization signal processing circuit, a method, and a program according to the present disclosure can perform non-linear distortion compensation in a transmitter and a receiver with high accuracy, in a communication system in which various pieces of distortion including non-linear distortion in the transmitter and the receiver are present.

The above described embodiments can be combined as desirable by one of ordinary skill in the art.

While the present disclosure has been particularly shown and described with reference to example embodiments thereof, the present disclosure is not limited to these example embodiments. It will be understood by those of ordinary skill in the art that various changes in form and details may be made therein without departing from the spirit and scope of the present disclosure as defined by the claims.

What is claimed is:

1. An equalization signal processing circuit comprising:
   a filter group configured to include a plurality of filters connected in series along a signal path of a reception signal being coherent-received, the plurality of filters including a plurality of non-linear distortion compensation filters configured to compensate for non-linear distortion included in the reception signal and one or more linear distortion compensation filters configured to compensate for linear distortion included in the reception signal;
   at least one memory storing instructions; and
   at least one processor configured to execute the instructions to:
   adaptively control, by using an error back propagation method, a filter coefficient of at least some of a plurality of non-linear distortion compensation filters and the linear distortion compensation filter, based on a difference between an output signal being output from the filter group and a predetermined value of the output signal.

2. The equalization signal processing circuit according to claim 1, wherein the plurality of non-linear distortion compensation filters include an intra-transmitter non-linear distortion compensation filter configured to compensate for non-linear distortion occurring in a transmitter, and an intra-receiver non-linear distortion compensation filter configured to compensate for non-linear distortion occurring in a receiver.

3. The equalization signal processing circuit according to claim 2, wherein, in the filter group, the intra-receiver non-linear distortion compensation filter is arranged before the intra-transmitter non-linear distortion compensation filter.

4. The equalization signal processing circuit according to claim 3, wherein
   the one or more linear distortion compensation filters include an intra-transmitter linear distortion compensation filter configured to compensate for linear distortion occurring in the transmitter, and an intra-receiver linear distortion compensation filter configured to compensate for linear distortion occurring in the receiver, and,
   in the filter group, the intra-receiver linear distortion compensation filter is arranged after the intra-receiver non-linear distortion compensation filter and before the intra-transmitter linear distortion compensation filter, and the intra-transmitter linear distortion compensation filter is arranged before the intra-transmitter non-linear distortion compensation filter.

5. The equalization signal processing circuit according to claim 4, wherein
   the one or more linear distortion compensation filters further include at least one of a wavelength dispersion compensation filter, a polarization separation filter, or a carrier phase compensation filter, and,
   in the filter group, at least one of the wavelength dispersion compensation filter, the polarization separation filter, or the carrier phase compensation filter are arranged between the intra-receiver linear distortion compensation filter and the intra-transmitter linear distortion compensation filter.

6. The equalization signal processing circuit according to claim 1, wherein the non-linear distortion compensation filter includes a deep neural network (DNN), a convolutional neural network (CNN), or a Volterra filter.

7. The equalization signal processing circuit according to claim 6, wherein the non-linear distortion compensation filter further includes a linear filter being connected in parallel with the DNN, the CNN, or the Volterra filter, adds an output of the DNN, the CNN, or the Volterra filter and an output of the linear filter, and outputs the added result as an output signal.

8. A receiver comprising:
   the equalization signal processing circuit according to claim 1; and
   a detector configured to coherent-receive a signal transmitted from a transmitter via a transmission path.

9. The receiver according to claim 8, wherein a plurality of non-linear distortion compensation filters include an intra-transmitter non-linear distortion compensation filter configured to compensate for non-linear distortion occurring in the transmitter, and an intra-receiver non-linear distortion compensation filter configured to compensate for non-linear distortion occurring in a receiver.

10. The receiver according to claim 9, wherein, in a filter group, the intra-receiver non-linear distortion compensation filter is arranged before the intra-transmitter non-linear distortion compensation filter.

11. The receiver according to claim 8, wherein the non-linear distortion compensation filter includes a deep neural network (DNN), a convolutional neural network (CNN), or a Volterra filter.

12. A communication system comprising:
   a transmitter configured to transmit a signal via a transmission path; and
   the receiver according to claim 8.

13. The communication system according to claim 12, wherein a plurality of non-linear distortion compensation filters include an intra-transmitter non-linear distortion compensation filter configured to compensate for non-linear distortion occurring in the transmitter, and an intra-receiver non-linear distortion compensation filter configured to compensate for non-linear distortion occurring in the receiver.

14. The communication system according to claim 13, wherein, in a filter group, the intra-receiver non-linear distortion compensation filter is arranged before the intra-transmitter non-linear distortion compensation filter.

15. The communication system according to claim 12, wherein the non-linear distortion compensation filter includes a deep neural network (DNN), a convolutional neural network (CNN), or a Volterra filter.

16. An equalization signal processing method comprising:
   calculating a loss function, based on a difference between an output signal being output from a filter group in which a plurality of filters connected in series along a signal path of a reception signal being coherent-received are included, the plurality of filters including a plurality of non-linear distortion compensation filters configured to compensate for non-linear distortion included in the reception signal and one or more linear distortion compensation filters configured to compensate for linear distortion included in the reception signal, and a predetermined value of the output signal; and adaptively controlling, by using an error back propagation method, a filter coefficient of at least some of a plurality of non-linear distortion compensation filters and the linear distortion compensation filter, based on the loss function.

17. A non-transitory computer readable medium storing a program for causing a processor to execute processing of:
  calculating a loss function, based on a difference between an output signal being output from a filter group in which a plurality of filters connected in series along a signal path of a reception signal being coherent-received are included, the plurality of filters including a plurality of non-linear distortion compensation filters configured to compensate for non-linear distortion included in the reception signal and one or more linear distortion compensation filters configured to compensate for linear distortion included in the reception signal, and a predetermined value of the output signal; and adaptively controlling, by using an error back propagation method, a filter coefficient of at least some of a plurality of non-linear distortion compensation filters and the linear distortion compensation filter, based on the loss function.

* * * * *